(12) United States Patent
Dinan

(10) Patent No.: US 8,533,122 B2
(45) Date of Patent: *Sep. 10, 2013

(54) WIRELESS PAYMENT WITH A PORTABLE DEVICE

(71) Applicant: Esmael Hejazi Dinan, Herndon, VA (US)

(72) Inventor: Esmael Hejazi Dinan, Herndon, VA (US)

(73) Assignee: Ofinno Technologies, LLC, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/789,986

(22) Filed: Mar. 8, 2013

(65) Prior Publication Data

US 2013/0204795 A1    Aug. 8, 2013

Related U.S. Application Data

(63) Continuation of application No. 13/437,590, filed on Apr. 2, 2012, now Pat. No. 8,433,657.

(60) Provisional application No. 61/572,285, filed on Apr. 15, 2011.

(51) Int. Cl.
*G06Q 20/02* (2012.01)
*G06Q 20/06* (2012.01)

(52) U.S. Cl.
USPC .............................................. 705/65; 705/64

(58) Field of Classification Search
None
See application file for complete search history.

(56) References Cited

U.S. PATENT DOCUMENTS

| 4,570,077 | A | 2/1986 | Lambley |
| 6,105,012 | A | 8/2000 | Chang et al. |
| 7,395,436 | B1 | 7/2008 | Nemovicher |
| 7,937,578 | B2 | 5/2011 | O'Neil |
| 7,939,578 | B2 | 5/2011 | Wright et al. |
| 7,984,156 | B2 | 7/2011 | Gauthier et al. |
| 8,086,544 | B2 | 12/2011 | Boss et al. |
| 8,140,666 | B2 | 3/2012 | Dias et al. |
| 8,224,993 | B1 | 7/2012 | Brandwine |
| 2002/0007453 | A1 | 1/2002 | Nemovicher |
| 2003/0130894 | A1 | 7/2003 | Huettner |
| 2005/0182675 | A1 | 8/2005 | Huettner |
| 2005/0195978 | A1 | 9/2005 | Babic et al. |
| 2007/0061835 | A1 | 3/2007 | Klein et al. |
| 2007/0133484 | A1 | 6/2007 | Albal et al. |
| 2008/0114992 | A1 | 5/2008 | Robert et al. |
| 2009/0089142 | A1 | 4/2009 | Boesch et al. |
| 2009/0213861 | A1 | 8/2009 | Benner et al. |
| 2009/0228450 | A1 | 9/2009 | Zhang |
| 2010/0094948 | A1 | 4/2010 | Ganesh et al. |
| 2010/0192157 | A1 | 7/2010 | Jackson |
| 2010/0287548 | A1 | 11/2010 | Zhou et al. |
| 2011/0149879 | A1 | 6/2011 | Noriega et al. |
| 2011/0153715 | A1 | 6/2011 | Oshins et al. |
| 2011/0264657 | A1 | 10/2011 | Hoffman et al. |
| 2012/0140712 | A1 | 6/2012 | Yamada et al. |
| 2012/0179824 | A1 | 7/2012 | Jackson |

*Primary Examiner* — Calvin L Hewitt, II
*Assistant Examiner* — Tim Hale
(74) *Attorney, Agent, or Firm* — Esmael Dinan; David Grossman

(57) ABSTRACT

A portable device transmits a payment card number to a merchant machine. The portable device generates an encrypted first message comprising a request to get information about a financial transaction. A packet filter maps the encrypted first message to a pre-established non-GBR bearer. The portable device generates a fourth message by encrypting the encrypted first message and transmits the fourth message. The portable device receives and decrypts a second encrypted message. The portable device decrypts the decrypted second message and sends financial transaction information to a display.

20 Claims, 4 Drawing Sheets

WIRELESS PAYMENT WITH A PORTABLE DEVICE

CROSS-REFERENCE TO RELATED APPLICATIONS

This application is a continuation of application Ser. No. 13/437,590, filed Apr. 2, 2012, entitled "Secure and Mobile Financial Transaction," which claims the benefit of U.S. Provisional Application No. 61/572,285, filed Apr. 15, 2011, entitled "Secure and Mobile Financial Transaction," which are hereby incorporated by reference in its entirety.

BACKGROUND OF THE INVENTION

As the use of portable wireless devices and other mobile devices increases, the availability of valuable services offered over these devices may also increase. Mobile phones may be used for activities such as: electronic banking, online shopping, stock brokerage, other services, and/or the like. Various creative software applications have been developed to enable these portable devices to perform a wide variety of applications from gaming, GPS navigation, emails, scientific and engineering activities, and/or the like.

Some people purchase goods and services using credit cards, debit cards, and/or the like. Cell phone may be used to electronically purchase goods and services instead of using a credit card. A cellular phone may be configured as a payment device for purchases from merchants, service providers, and/or the like. Cellular device may employ wireless cellular service(s) to process financial transaction(s). Cellular telephone payment device(s) and network(s) may replace conventional credit cards and cash payments at the time of purchase. The need for both merchant machine(s) and credit card(s) may be minimized in performing financial transaction(s).

While the services offered over mobile devices may become more valuable, the need for security may gain importance. Also, wireless networks and protocols may become more complicated. Wireless propagation fading and higher bit error rates may introduce new challenges for transmission of data. Wireless networks may offer a variety of services with different qualities of service. A packet may traverse through multiple nodes in a heterogeneous wireless and/or wireline network to reach to a destination on the Internet. There may be a need to enhance the purchase process including security, packet transmission, packet processing, and/or the like.

DETAILED DESCRIPTION OF EMBODIMENTS

Example embodiments of the present invention use a portable device to assist a financial transaction related to a purchase of a user. Example embodiments of the present invention process financial transactions related to a user purchase. More particularly, the embodiments relate to enhancing the purchase process along with optimizing the security, packet transmission and packet processing.

Figure 1:
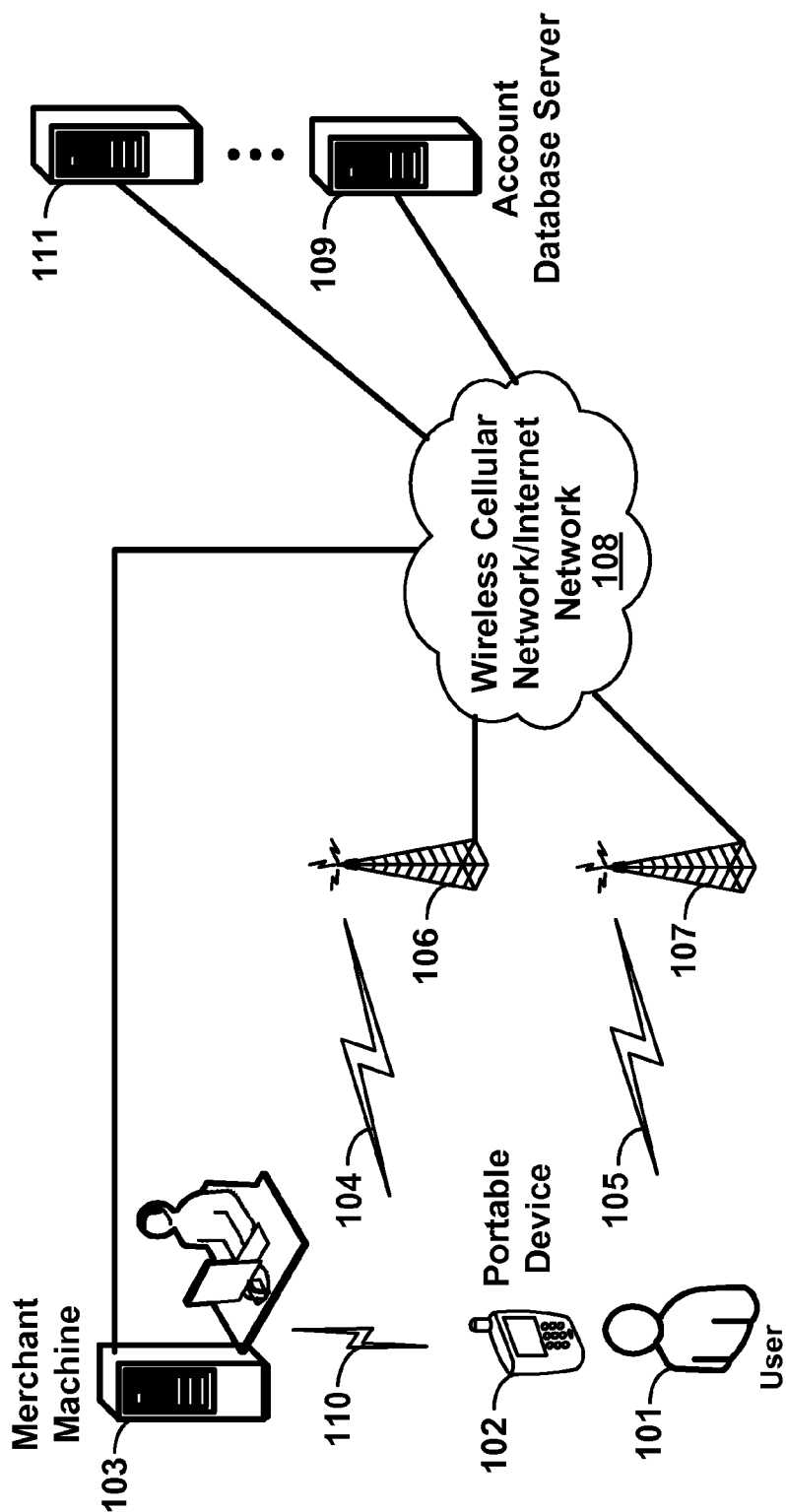
FIG. 1 is an example block diagram illustrating a financial transaction employing a portable device as per an aspect of an embodiment of the present invention.

FIG. 1 is an example block diagram illustrating a financial transaction employing a portable device as per an aspect of an embodiment of the present invention. As shown, the system comprises a Wireless Cellular Network/Internet Network 108, which may function to provide connectivity between one or more access terminals 102 (e.g., a cell phone, PDA, other wirelessly-equipped device, or the like), and one or more database servers (e.g. account database server 109 and 111, or the like), and a merchant machine 103.

It should be understood, however, that this and other arrangements described herein are set forth for purposes of example only. As such, those skilled in the art will appreciate that other arrangements and other elements (e.g., machines, interfaces, functions, orders of functions, or the like) may be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software in combination with hardware. For instance, various functions may be carried out by one or more processors executing a set of machine readable instructions stored in memory.

As shown, the access network may comprise a plurality of base stations 106-107. Each base station 106-107 may function to transmit and receive RF radiation 104-105 at one or more carrier frequencies. The RF radiation may provide one or more interfaces over which the access terminal 102 may communicate with the base stations 106-107. The user 101 may employ the wireless device to assist a financial transaction. The user, for example, may be a customer in a department store or grocery store.

Each of the one or more base stations 106-107 may define a corresponding wireless coverage area. The RF radiation 104-105 of the base stations 106-107 may carry communications between the Wireless Cellular Network/Internet Network 108 and access terminal 102 according to a variety of protocols. For example, RF radiation 104-105 may carry communications according to WiMAX (e.g., IEEE 802.16), LTE, LTE-Advanced, microwave, satellite, MMDS, Wi-Fi (e.g., IEEE 802.11), Bluetooth, infrared, other protocols now known or later developed, or the like.

As shown, the merchant machine 103 may be connected to Wireless Cellular Network/Internet Network 108 through a wireline or wireless technology. The user portable device 102 may be configured to communicate with the merchant machine 103 via a short range wireless technology 110 (e.g. Bluetooth, near field communications, infrared, Wi-Fi, cellular wireless technology, wireline technology such as USB, Ethernet or any other physical medium, or the like). The user may enable a communication between the portable device and the merchant machine, and/or between the portable device and the account server, for example, by providing an authorization input (e.g. providing a PIN number, providing biometric input, providing a key, or the like), or by running an application. The user may further enable or initiate communications between the portable device and the merchant machine by enabling physical layer communication, for example, by moving the portable device close to the merchant machine in order to initiate the transaction. Communication via a short range wireless technology may require a short distance between the portable device and the merchant machine. The communication among merchant machine 103, user portable device 102, and account database server 109 may be enabled by networking and transport technology (e.g. TCP/IP, UDP, RTP, other networking protocol, or the like).

Figure 2:
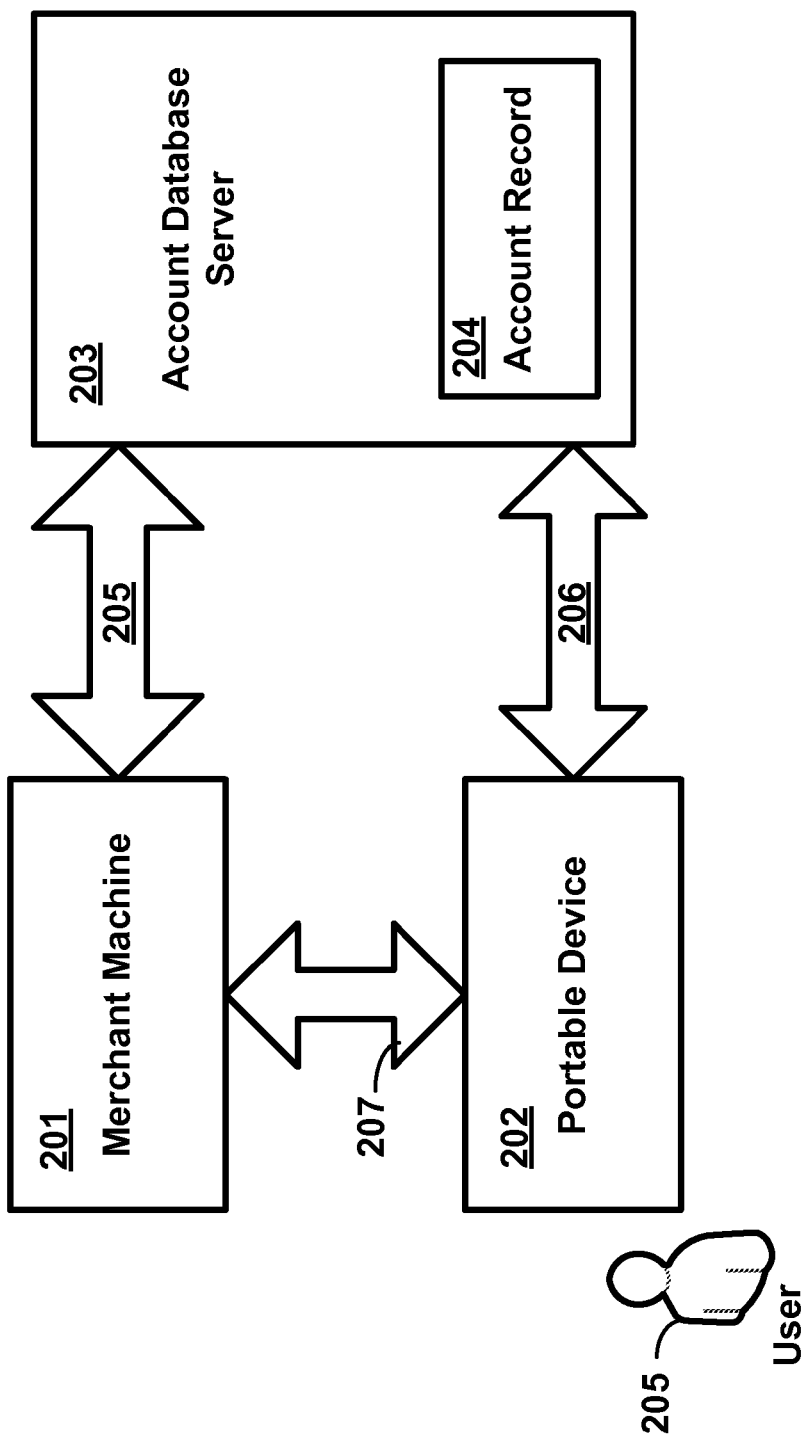
FIG. 2 is an example block diagram illustrating a financial transaction employing a portable device as per an aspect of an embodiment of the present invention.

FIG. 2 is an example block diagram illustrating a financial transaction employing a portable device as per an aspect of an embodiment of the present invention. According to some of the various embodiments, merchant machine 201 may be a point-of-sale in a grocery store, department store, a service provider (such as an insurance company) or a government entity. The merchant machine 201 may communicate with portable device 202 via interface 207. The portable device 202 may include, but is not limited to: a cell phone, a smart phone, a portable personal computer, or the like. According to some of the various embodiments, the portable device 202 may comprise at least one communication interface(s), processor(s), and program code instructions stored in memory and executable by the processor(s) in order to perform various functions. Portable device 202 may be configured to process the commands or inputs of the user 205. The user 205 in an example embodiment may be a customer in a merchant store. The merchant machine 201 may communicate with account database server 203 via interface 205.

According to some of the various embodiments, account database server 203 may comprise many account records. Account record data may comprise credit card number(s), expiration date(s), maximum credit limit(s), current balance(s), account history(ies) and/or account transaction(s). Account database server 203 may communicate with a portable device 202 via interface 206. Account database server 203 may comprise a distributed architecture and/or may comprise multiple servers. In an example embodiment, some of the servers may communicate with merchant machine 201, and some other servers may communicate with user portable devices. These servers may or may not be managed by different entities. A person skilled in the art will recognize that financial entit(ies) may implement various alternative systems in order to store and manage financial data and/or financial transaction(s) related to users and/or merchant machines.

According to some of the various embodiments, an application to assist a financial transaction related to a purchase may be developed for use on a cell phone device. Cell phone device(s) may have an open architecture where an application may be developed by a third party and installed by a user. Interface programs may be developed between account database server(s) and cell phone application(s) for data input and/or user notifications.

An example embodiment of the invention may provide a method and system for a portable device 102 to assist a financial transaction related to a purchase of a user. Another example embodiment may provide a non-transitory tangible computer readable media containing a series of instructions that when executed by one or more processors causes a method of assisting a financial transaction related to a purchase of a user to execute. Another example embodiment may provide an article of manufacture, comprising a machine-accessible medium having instructions encoded thereon for enabling a processor in a portable device to assist a financial transaction related to a purchase of a user. The portable device 102 may comprise first and second receiver modules, first and second transmitter modules, encryption and decryption modules, and/or a user interface module. The portable device 102 may store a first encryption key, a second decryption key, and/or a network address of an account database server 109.

Figure 3:
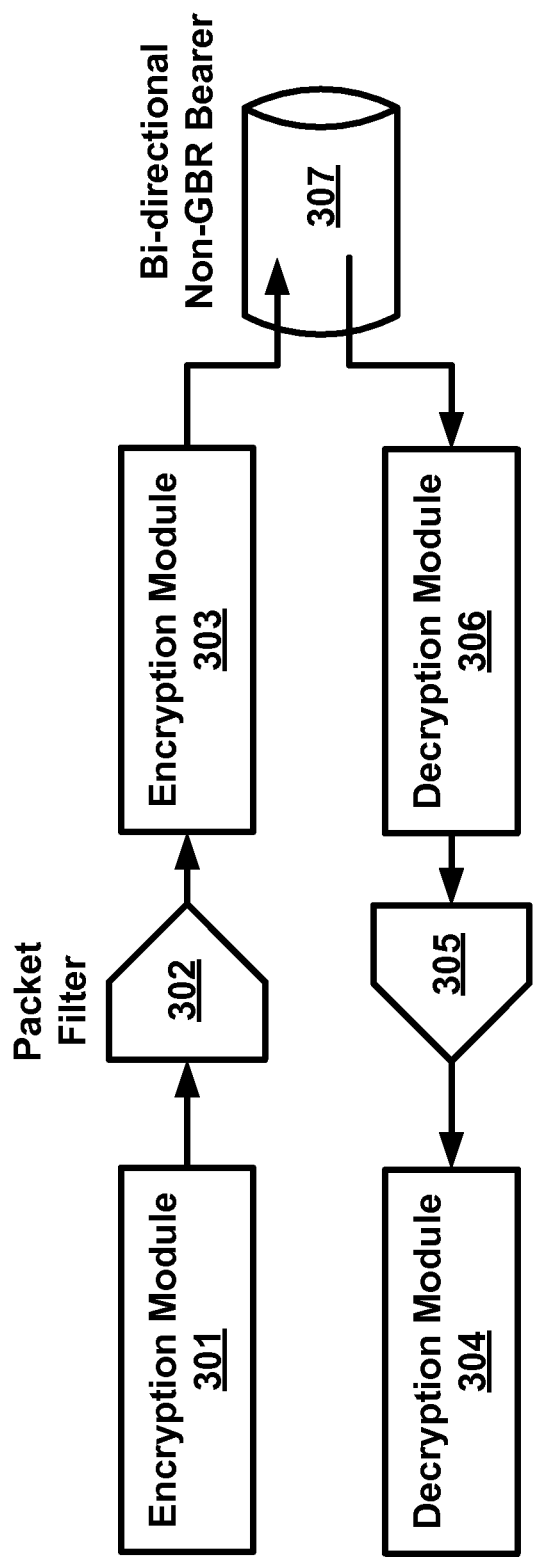
FIG. 3 is an example block diagram illustrating encryption, filtering and transmission employed used in an aspect of an embodiment of the present invention.

FIG. 3 is an example block diagram illustrating encryption, filtering and transmission employed used in an aspect of an embodiment of the present invention. In an example embodiment, the encryption module 301 may encrypt a first message using a first encryption key. The first message may comprise a request to get information about a financial account configured in the portable device 102. The first transmitter module may transmit the encrypted first message to an account database server 109. The message may comprise the network address of the server and may be destined to the server. The encrypted first message may be mapped to a pre-established non-GBR bearer 307. The mapping may be performed by a packet filter 302 using packet protocol header of the encrypted first message. The encrypted first message may be encrypted by encryption module 303 for a second time using a third encryption key before being transmitted on a first plurality of OFDM subcarriers (or SC-FDMA subcarriers).

According to some of the various embodiments, the portable device may receive a second encrypted message from the account database server using the pre-established non-GBR bearer 307. The second encrypted message may be decrypted by decryption module 306 using a fourth decryption key after being received on a second plurality of OFDM subcarriers (or SC-FDMA subcarriers). The filter 305 may filter and direct packet to decryption module 304. The decryption module 304 may decrypt the decrypted second message using a second decryption key. The portable device may store the financial account information. The message may comprise an amount related to a purchase, an account balance, and/or account history, and/or the like. The portable device 102 may display at least a portion of the financial account information.

According to some of the various embodiments, the portable device may receive a request message from a merchant machine 103. This may be in response to, for example, the user moving the portable device close to the merchant machine to enable a short range communication, or the user entering an input to portable machine, or the user running an application, and/or the like. In an example embodiment, the request message may comprise, for example, an amount related to the purchase, and/or some information related to the merchant machine, and/or the merchant, and/or the like. The portable device may transmit a response message to the merchant machine 103. The response message may comprise account related information for the merchant machine 103 to trigger a financial debit from the financial account or trigger a financial credit to the financial account. In an example embodiment, the portable device may receive an input from the user 101 enabling the financial transaction.

Figure 4:
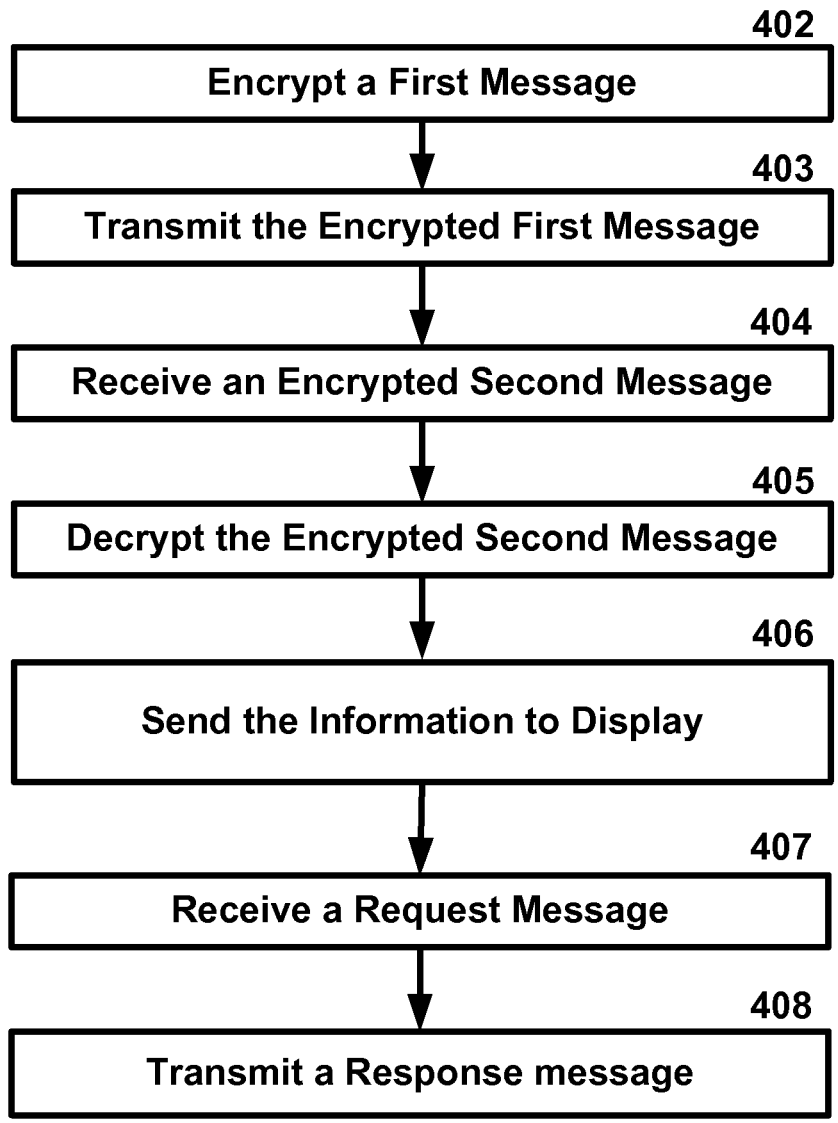
FIG. 4 is an example flow diagram illustrating a financial transaction employing a portable device as per an aspect of an embodiment of the present invention.

FIG. 4 is an example flow diagram illustrating a financial transaction employing a portable device as per an aspect of an embodiment of the present invention. The application may store a first encryption key, a second decryption key, and a network address of an account database server. A user may initiate or enable the example process by providing an authorization input, such as providing a PIN number, providing a biometric input, running an application, and/or the like. In task 402, the portable device may encrypt a first message using a first encryption key. The first message may comprise a request to get information about a financial account configured in the portable device. The portable device may verify a certificate transmitted from the account database server. In another example, the server may verify a certificate transmitted from the portable device. This may ensure reasonable protection from eavesdroppers and man-in-the-middle attacks. Adequate cipher suites may be employed and/or the server certificate may be verified and trusted.

The portable device may transmit the encrypted first message to the account database server via a first wireless interface using the network address at 403. According to some of the various embodiments, a first wireless interface may include a wireless receiver and/or wireless transmitter. The wireless receiver and/or wireless transmitter may employ short range wireless technology, long range wireless technology, and/or intermediate range wireless technology. The first and second wireless interface may be the same or different wireless interfaces. In an example embodiment, the first and second wireless interfaces may both refer to the same WiFi interface. In another example embodiment, the first interface may be a WiFi interface or a near field communication interface, and the second interface may be a cellular wireless interface. In another further example embodiment, both first and second interface may refer to the same type of wireless interface.

According to some of the various embodiments, the encrypted first message may be mapped to a pre-established non-GBR (GBR: guaranteed bit rate) bearer. The mapping may be performed by a packet filter using packet protocol header of the encrypted first message. The encrypted first message may be encrypted for an additional time using a third encryption key before being transmitted on a first plurality of subcarriers, e.g. OFDM (orthogonal frequency division multiple access) subcarriers, SC-FDMA (single carrier—frequency division multiple access) subcarriers and/or the like. In an example, The first encryption key may be received from a first network node and the third encryption key may be received from a second network node by the portable device. In another example, the first encryption key may be associated with the first network node and the third encryption key may be associated with a second network node. A key is associated with a node, for example, when it is received from the node, or when it is stored to be used in a communication with the node, or when it is calculated based, at least in part, on the parameters of the node or parameters received from the node. The first network node may be different than the second network node. The encrypted first message may be encrypted using the third encryption key and at least one other parameter that changes substantially rapidly over time. For example, the one other parameter may change after every one or more radio frame period. For example, the one other parameter may change every 1 msec, 10 msec, or 100 msec.

According to some of the various embodiments, an IP packet header may be added to the encrypted first message before the encrypted first message is encrypted for an additional time. A packet header comprising a sequence number may be added to the packet after the encrypted first message is encrypted for an additional time. The packet headers may help to transfer and route the packet to a destination. Packet headers may be added for the wireless transmission of the encrypted first message by a wireless transmitter physical and MAC layers. These MAC and physical layer packet headers may transmitted without encryption.

According to some of the various embodiments, the first plurality of OFDM subcarriers (or SC-FDMA subcarriers) may comprise a plurality of adjacent OFDM subcarriers (or SC-FDMA subcarriers) at any given time during transmission period. A first part of a first physical layer transport block of the encrypted first message may be transmitted on a first subset of the first plurality of OFDM subcarriers (or SC-FDMA subcarriers) in a first time period, and a second part of the first physical layer transport block of the encrypted first message may be transmitted on a second subset of the first plurality of OFDM subcarriers (or SC-FDMA subcarriers) in a second time period. The first time period and the second time period may not overlap. The first subset of the first plurality of OFDM subcarriers (or SC-FDMA subcarriers) and the second subset of the first plurality of OFDM subcarriers (or SC-FDMA subcarriers) may be different. Such a transmission process may help to reduce the effect of radio interface fading and interference.

According to some of the various embodiments, after transmission of the encrypted first message, the portable device may receive at least two packet acknowledgements comprising acknowledgement from a cellular base station and acknowledgement from the account database server. Acknowledgement may include a field indicating successful reception of the message or a segment of the message. The pre-established non-GBR (GBR: Guaranteed Bit Rate) bearer may be assigned a plurality of attributes comprising at least one the following: a scheduling priority, an allocation and retention priority, a portable device aggregate maximum bit rate and/or the like. These attributes may be used by the network to assign proper resources to the non-GBR bearer.

The portable device may receive a second encrypted message from the account database server via the second wireless interface using the pre-established non-GBR bearer at 404. The second encrypted message may be decrypted using a fourth decryption key after being received on a second plurality of OFDM subcarriers (or SC-FDMA subcarriers). The second plurality of OFDM subcarriers (or SC-FDMA subcarriers) may comprise a plurality of non-adjacent OFDM subcarriers (or SC-FDMA subcarriers) at any given time during reception period. Non-adjacent OFDM subcarriers may imply that there is at least one subcarrier belonging to other user data among said subcarriers. Non-adjacent subcarriers may be called non-contiguous subcarriers.

According to some of the various embodiments, a first part of a second physical layer transport block of the second encrypted message may be received on a third subset of the second plurality of OFDM subcarriers (or SC-FDMA subcarriers) in a third time period, and a fourth part of the second physical layer transport block of the second encrypted message may be received on a fourth subset of the second plurality of OFDM subcarriers (or SC-FDMA subcarriers) in a fourth time period. The third time period and the fourth time period may not overlap. The third subset of the second plurality of OFDM subcarriers (or SC-FDMA subcarriers) and the fourth subset of the second plurality of OFDM subcarriers (or SC-FDMA subcarriers) may be different. Such a transmission and reception process may help to reduce the effect of radio interface fading and interference.

According to some of the various embodiments, the portable device may decrypt the decrypted second message using the second decryption key at 405. The portable device may store the financial account information. The second decryption key may be received from a third network node and the fourth decryption key may be received from a forth network node by the portable device. The third network node may be different than the forth network node. The second encrypted message may be decrypted using the fourth decryption key and at least one other parameter that changes substantially rapidly over time. For example, the one other parameter may change after every single radio frame or sub-frame period or after every couple of frames. For example, the one other parameter may change every 1 msec, 10 msec, or 100 msec. The financial account information may comprise at least one of the following parameters: available credit, maximum credit limit, transaction history, a purchase amount, and/or the like.

According to some of the various embodiments, the application may send at least a portion of the financial account information to portable device display at 406. A user may initiate or enable a communication between the portable device and the merchant machine, for example, by providing an authorization input such as providing a PIN number, providing a biometric input, and/or running an application, and/or the like. The user may further enable or initiate the communication between the portable device and the merchant machine by enabling physical layer communication, for example, by moving the portable device close to the merchant machine in order to initiate the transaction. According to some of the various embodiments, the application may receive a request message from a merchant machine via a second wireless interface at 407. In an example embodiment, the request message from the merchant machine may be received via a short range wireless technology. The message may include parameters such as, machine information, merchant information, purchase amount, authentication information, and/or the like. This request message may be a request for a credit card number, a debit card number, an account number, a gift card number, other financial information, and/or the like. To trigger a financial transaction, the merchant machine may require a credit card number, a debit card number, an account number, a gift card number, other financial information, and/or the like. For example, if the user is purchasing merchandises from a merchant, the merchant may charge the client using the card information. In another example, if the user is returning an item or many items, and/or is returning services, the merchant may trigger a refund.

The portable device may transmit a response message to the merchant machine via the second wireless interface at 408. The response message may comprise account related information for the merchant machine to trigger a financial debit from the financial account and/or to credit the financial account. The response may be transmitted to the merchant machine, for example after the user provides an input such as a PIN number or a biometric input, or an approval, and/or the like. The response message may also inform the merchant machine that a transaction cannot be enabled. The user may further provide input to enable the transaction, for example, sign on a merchant machine pad, sign a paper, provide a PIN, provide a biometric input, and/or the like. The portable device may receive an encrypted (or un-encrypted) third message from the account database server (or the merchant machine) after the financial transaction is triggered. The third message may comprise updated account information. The updated account information may, for example, comprise the amount of said transaction, merchant information, date or transaction, and/or the remaining balance in the financial account (e.g. a credit card, a pre-pay card, a gift card and/or the like).

The order of tasks 402 to 408 and subtasks may be changed. Similarly, some embodiments may not employ all of the tasks 402 to 408. It is also envisioned that some embodiments may employ additional tasks. For example, example embodiments may use alternative ordering. For example, the portable device may wirelessly receive a request message from a merchant machine. In an example embodiment, the request message may comprise an amount related to the purchase. In an example process, the portable device may receive an input from the user approving the financial transaction. In another example, an input may not be required. The portable device may wirelessly transmit a response message to the merchant machine. The response message may comprise required account related information for the merchant machine to trigger a financial debit from a financial account or to credit to a financial account.

The portable device may store a first encryption key, a second decryption key, and a network address of an account database server. The portable device may encrypt a first message using the first encryption key. The first message may comprise a request to get information about a financial account configured in the portable device. The portable device may wirelessly transmit the encrypted first message to the account database server using the network address. The encrypted first message may be mapped to a pre-established non-GBR bearer. The mapping may be employed by a packet filter using packet protocol header(s) of the encrypted first message. The encrypted first message may be encrypted for an additional time using a third encryption key before being transmitted on a first plurality of OFDM subcarriers (or SC-FDMA subcarriers).

The portable device may wirelessly receive a second encrypted message from the account database server using the pre-established non-GBR bearer. The second encrypted message may be decrypted using a fourth decryption key after being received on a second plurality of OFDM subcarriers (or SC-FDMA subcarriers). The portable device may decrypt the decrypted second message using the second decryption key and storing the financial account information. The portable device may send to a display at least a portion of the financial account information.

In another example embodiment of the invention, a portable device may store a network address of an account database server. The portable device may encrypt a first message using a first encryption key. The first message may comprise a request to get information about a financial account configured in the portable device. The portable device may transmit the encrypted first message to the account database server using the network address. The encrypted first message may be mapped to a pre-established non-GBR bearer. The encrypted first message may be encrypted for an additional time using a third encryption key before being transmitted on a first plurality of subcarriers of an OFDM wireless network. The portable device may receive a second encrypted message from the account database server using the pre-established non-GBR bearer. The second encrypted message may be decrypted using a fourth decryption key after being received on a second plurality of subcarriers of the OFDM wireless network. The second encrypted message may comprise financial account information.

According to some of the various embodiments, the portable device may decrypt the decrypted second message using a second decryption key. The portable device may store the financial account information. The portable device may send to display at least a portion of the financial account information. The portable device may wirelessly receive a request signal from a merchant machine. The portable device may wirelessly transmit a response message to the merchant machine. The response message may comprise account related information for the merchant machine to trigger a financial debit from a financial account or credit a financial account. The portable device may receive a message comprising an amount related to the purchase. The message may be received from the account database server using the pre-established non-GBR bearer. The amount may be transmitted to the account database server by the merchant machine. The encrypted first message may be mapped to the pre-established non-GBR bearer by a packet filter using packet protocol header of the encrypted first message. The portable device may receive the request signal from the merchant machine in response to the user enabling the financial transaction.

In another example embodiment, a portable device may store a network address of an account database server. The portable device may receive an input from the user enabling the financial transaction. The portable device may wirelessly receive a request signal from a merchant machine. The portable device may wirelessly transmit a response message to the merchant machine. The response message may comprise account related information for the merchant machine to trigger a financial debit from a financial account or credit a financial account. The portable device may encrypt a first message using a first encryption key. The first message may comprise a request to get information about a financial account configured in the portable device.

According to some of the various aspects of embodiments, the portable device may transmit the encrypted first message to the account database server. The message may comprise the network address. The encrypted first message may be mapped to a pre-established non-GBR bearer. The encrypted first message may be encrypted for an additional time using a third encryption key before being transmitted on a first plurality of subcarriers of an OFDM wireless network. The portable device may receive a second encrypted message from the account database server using the pre-established non-GBR bearer. The second encrypted message may be decrypted using a fourth decryption key after being received on a second plurality of subcarriers of the OFDM wireless network. The second encrypted message may comprise financial account information. The portable device may decrypt the decrypted second message using a second decryption key and storing the financial account information. The portable device may send to a display at least a portion of the financial account information.

In another example embodiment, the portable device may store a network address of an account database server. The portable device may receive an input from the user enabling the financial transaction. The portable device may wirelessly receive a request signal from a merchant machine. The portable device may wirelessly transmit a response message to the merchant machine. The response message may comprise required account related information for the merchant machine to trigger a financial debit from the financial account or credit to the financial account. The portable device may receive a second encrypted message from the account database server using a pre-established non-GBR bearer. The second encrypted message may be decrypted using a fourth decryption key after being received on a second plurality of subcarriers of an OFDM wireless network. The second encrypted message may comprise financial account information. The portable device may decrypt the decrypted second message using a second decryption key, and may store the financial account information.

The portable device may encrypt a first message using a first encryption key. The first message may comprise an acknowledgement for receipt of the financial account information. The portable device may transmit the encrypted first message to the account database server using the network address. The encrypted first message may be mapped to a pre-established non-GBR bearer. The encrypted first message may be encrypted for an additional time using a third encryption key before being transmitted on a first plurality of subcarriers of the OFDM wireless network. The portable device may send to a display at least a portion of the financial account information.

In an example embodiment, the second encryption key is received from a first network node and the fourth encryption key is received from a second network node by the portable device. In another example, the second encryption key may be associated with the first network node and the third encryption key may be associated with a second network node. A key is associated with a node, for example, when it is received from the node, or when it is stored to be used in a communication with the node, or when it is calculated based, at least in part, on the parameters of the node or parameters received from the node. The first network node may be different than the second network node. The second decryption key may be received from a third network node and the fourth decryption key may be received from a forth network node by the portable device, wherein the third network node is different than the forth network node. The request message from the merchant machine may be received via a short range wireless technology. After transmission of the encrypted first message, the portable device may receive at least two packet acknowledgements comprising one acknowledgement from a cellular base station and one acknowledgement from the account database server. The pre-established non-GBR bearer may be assigned a plurality of attributes comprising: a scheduling priority, an allocation and retention priority, a portable device aggregate maximum bit rate, and/or the like.

The encrypted first message may be encrypted using the third encryption key and at least one other parameter that changes substantially rapidly over time. The second encrypted message may be decrypted using the fourth decryption key and at least one other parameter that changes substantially rapidly over time. The second plurality of subcarriers may comprise a plurality of non-contiguous OFDM subcarriers at any given time during a transmission period. The first plurality of subcarriers may consist of a plurality of adjacent SC-FDMA subcarriers at any given time during a transmission period. A first part of the encrypted first message may be transmitted on a first subset of the first plurality of subcarriers in a first time period, and a second part of the encrypted first message may be transmitted on a second subset of the first plurality of subcarriers in a second time period, wherein: a) the first time period and the second time period do not overlap, and b) the first subset of the first plurality of subcarriers and the second subset of the first plurality of subcarriers are different.

An IP packet header may be added to the encrypted first message before the encrypted first message is encrypted for an additional time. A packet header comprising a sequence number may be added to the packet after the encrypted first message is encrypted for an additional time. Packet headers may be added for the wireless transmission of the encrypted first message by a wireless transmitter physical and MAC layers. These packet headers are transmitted without encryption. The portable device may verify a certificate transmitted from the account database server before transmitting the encrypted first message. The portable device may receive an encrypted third message from the account database server after the financial transaction is triggered. The encrypted third message may comprise updated account information. The financial account information may comprise an amount related to a purchase.

According to some of the various embodiments, an encryption of a value may be applied to a plain value or an already encrypted value. In some cases, an encryption may include multiple encryptions. For example, one may provide a triple encryption of a value such as applying triple DES encryption. Similarly, decryption may reverse the encryption process.

In this specification, "a" and "an" and similar phrases are to be interpreted as "at least one" and "one or more."

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) of a centralized Account Database Server 203 which may perform authentication tasks and stores account records. However, one skilled in the art will recognize that embodiments of the invention could be implemented in a system, in which Account Database server 203 tasks are implemented in a distributed system. In such a distributed system, multiple servers may perform the tasks related to the Database Server.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments. Similarly, ordering in a claim is intended to be interpreted as order independent when order is not necessary to achieve an intended purpose of the claimed invention.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that comprise the express language "means for" or "step for" be interpreted under 35 U.S.C. 112, paragraph 6. Claims that do not expressly comprise the phrase "means for" or "step for" are not to be interpreted under 35 U.S.C. 112, paragraph 6.

What is claimed is:

1. A portable device, comprising:
one or more processors;
a first wireless interface;
a second wireless interface;
a non-transitory computer readable medium comprising executable instructions that, when executed by the one or more processors, cause the one or more processors to perform the steps of:
receiving, via said first wireless interface, an account information request signal from a merchant machine;
transmitting, via said first wireless interface, a response message to said merchant machine, said response message comprising said account information for said merchant machine;
encrypting a first message using a first encryption key, said first message comprising a requesting to get information about a financial account configured in said portable device;
mapping, by a packet filter, said encrypted first message to a pre-established non-GBR bearer;
generating a fourth message by encrypting said encrypted first message for an additional time employing a third encryption key;
transmitting on said non-GBR bearer, via said second wireless interface, said fourth message on a first plurality of subcarriers of an OFDM wireless network;
receiving on said pre-established non-GBR bearer, via said second wireless interface, a second encrypted message on a second plurality of subcarriers of said OFDM wireless network;
decrypting said second encrypted message using a fourth decryption key, said second encrypted message comprising said financial account information;
decrypting said decrypted second message using a second decryption key, and store said financial account information; and
sending to a display at least a portion of said financial account information.

2. The portable device of claim 1, wherein said instructions cause said processors to perform the steps of:
receiving said second decryption key from a third network node; and
receiving said fourth decryption key from a fourth network node, said third network node being different from said fourth network node.

3. The portable device of claim 1, wherein said instructions cause said processors to perform the steps of:
receiving, after transmission of said encrypted first message, at least two packet acknowledgements comprising:
acknowledgement from a cellular base station; and
acknowledgement from said account database server.

4. The portable device of claim 1, wherein said pre-established non-GBR bearer has a plurality of attributes comprising: a scheduling priority; an allocation and retention priority; and a portable device aggregate maximum bit rate.

5. The portable device of claim 1, wherein said second plurality of subcarriers comprises a plurality of non-contiguous OFDM subcarriers at any given time during transmission period.

6. The portable device of claim 1, wherein said instructions cause said processors to perform the step of:
receiving a certificate from an account database server before transmitting said encrypted first message.

7. The portable device of claim 1, wherein said instructions cause said processors to perform the steps of:
transmitting a first part of said encrypted first message on a first subset of said first plurality of subcarriers in a first time period; and
transmitting a second part of said encrypted first message on a second subset of said first plurality of subcarriers in a second time period; wherein:
said first time period and said second time period do not overlap; and
said first subset of said first plurality of subcarriers and said second subset of said first plurality of subcarriers are different.

8. The portable device of claim 1, wherein said instructions cause said processors to perform the steps of:
adding an IP packet header to said encrypted first message before said encrypted first message is encrypted employing said third key.

9. A portable device, comprising:
one or more processors;
a first wireless interface;
a second wireless interface;
a non-transitory computer readable medium comprising executable instructions that, when executed by the one or more processors, cause the one or more processors to perform the steps of:
receiving, via said first wireless interface, a request signal from a merchant machine;
transmitting, via said first wireless interface, a response message to said merchant machine, said response message comprising a payment card number for said merchant machine;
receiving a certificate from an account server subsequent to transmitting said response message;
verifying the certificate from the account server;
generating an encrypted first message, subsequent to verifying said certificate, by encrypting a first message using a first encryption key and by adding at least one packet header, said first message comprising a request to get information about a financial transaction of said payment card;
mapping, by a packet filter, said encrypted first message to a pre-established non-GBR bearer;
generating a fourth message by encrypting said encrypted first message for an additional time employing a third encryption key;
transmitting on said non-GBR bearer, via said second wireless interface, said fourth message on a first plurality of subcarriers of an OFDM wireless network;
receiving on said pre-established non-GBR bearer, via said second wireless interface, a second encrypted message on a second plurality of subcarriers of said OFDM wireless network;
decrypting said second encrypted message using a fourth decryption key, said second encrypted message comprising said financial transaction information;
decrypting said decrypted second message using a second decryption key, and store said financial transaction information; and
sending to a display at least a portion of said financial transaction information.

10. The portable device of claim 9, wherein said instructions cause said processors to perform the step of:
mapping said encrypted first message to said pre-established non-GBR bearer employing, at least in part, said at least one packet header.

11. The portable device of claim 9, said instructions cause said processors to perform the step of:
adding a packet header comprising a sequence number to a packet after said encrypted first message is encrypted employing said third key.

12. The portable device of claim 9, said instructions cause said processors to perform the step of:
adding a packet header by a MAC layer to said encrypted first message for transmission over said second wireless interface, and said packet header being transmitted without encryption.

13. The portable device of claim 9, wherein said pre-established non-GBR bearer has a plurality of attributes comprising: a scheduling priority; an allocation and retention priority; and a portable device aggregate maximum bit rate.

14. The portable device of claim 9, wherein said instructions cause said processors to perform the step of:
receiving said second decryption key from a third network node; and
receiving said fourth decryption key from a fourth network node, said third network node being different than said fourth network node.

15. A portable device, comprising:
one or more processors;
a first wireless interface;
a second wireless interface;
a non-transitory computer readable medium comprising executable instructions that, when executed by the one or more processors, cause the one or more processors to perform the step of:
receiving, via said first wireless interface, a request signal from a merchant machine;
transmitting, via said first wireless interface, a response message to said merchant machine, said response message comprising a payment card number for said merchant machine;
generating an encrypted first message, subsequent to transmitting said response message, by encrypting a first message using a first encryption key and by adding at least one packet header, said first message comprising a request to get information about a financial transaction of said payment card;
mapping, by a packet filter, said encrypted first message to a pre-established non-GBR bearer;
generating a fourth message by encrypting said encrypted first message for an additional time employing a third encryption key;
transmitting on said non-GBR bearer, via said second wireless interface, said fourth message on a first plurality of subcarriers of an OFDM wireless network;
receiving on said pre-established non-GBR bearer, via said second wireless interface, a second encrypted message on a second plurality of subcarriers of said OFDM wireless network;
decrypting said second encrypted message using a fourth decryption key, said second encrypted message comprising said financial transaction information;
decrypting said decrypted second message using a second decryption key, and store said financial transaction information; and
sending to a display at least a portion of said financial transaction information.

16. The portable device of claim 15, said instructions cause said processors to perform the step of:

verifying a certificate received from said account database server before transmitting said encrypted first message.

17. The portable device of claim 15, wherein said processors perform the step of:
receiving said request signal from said merchant machine in response to a user enabling said financial transaction.

18. The portable device of claim 15, wherein said processors cause said portable device to perform the step of:
receiving said second decryption key from a third network node; and
receiving said fourth decryption key from a fourth network node, said third network node being different from said fourth network node.

19. The portable device of claim 15, wherein said first plurality of subcarriers consists of a plurality of adjacent SC-FDMA subcarriers at any given time during transmission period.

20. The portable device of claim 15, wherein said pre-established non-GBR bearer has a plurality of attributes comprising: a scheduling priority; an allocation and retention priority; and a portable device aggregate maximum bit rate.

\* \* \* \* \*